United States Patent [19]

Uhlmann et al.

[11] 4,046,586

[45] Sept. 6, 1977

[54] STABILIZED PHOTOCHROMIC MATERIALS

[75] Inventors: Donald R. Uhlmann, Newton; Elias Snitzer, Wellesley; Richard J. Hovey, Sturbridge; Nori Y. C. Chu, Southbridge, all of Mass.; Joseph T. Fournier, Jr., Storrs, Conn.

[73] Assignee: American Optical Corporation, Southbridge, Mass.

[21] Appl. No.: 544,078

[22] Filed: Jan. 27, 1975

Related U.S. Application Data

[63] Continuation-in-part of Ser. No. 498,506, Aug. 19, 1974, abandoned.

[51] Int. Cl.$^2$ ............ C08L 1/10; G02B 5/23
[52] U.S. Cl. ............ 106/194; 106/DIG. 6; 252/300; 260/42.14; 260/37 PC; 260/37 R; 350/160 P; 351/163; 428/403; 428/404; 428/406; 428/413
[58] Field of Search ............ 96/84 R, 90 PC, 94 R, 96/108, 114.6, 114.7; 106/1, 54, 194, DIG. 6, 52; 252/300; 350/160 P; 351/163; 427/12, 221, 166; 428/403, 404, 406, 413, 432; 264/7, 10

[56] References Cited

U.S. PATENT DOCUMENTS

| | | | |
|---|---|---|---|
| 2,626,867 | 1/1953 | Webster | 96/114.7 X |
| 2,694,637 | 11/1954 | Gray | 96/114.77 X |
| 3,208,860 | 9/1965 | Armstead et al. | 96/94 R X |
| 3,411,907 | 11/1968 | Whitmore et al. | 96/94 R X |
| 3,419,396 | 12/1968 | Chateau et al. | 96/108 |
| 3,420,669 | 1/1969 | Sutherns et al. | 96/108 |
| 3,449,103 | 6/1969 | Stookey | 106/DIG. 6 |
| 3,466,216 | 9/1969 | Cooley et al. | 350/160 P X |
| 3,637,391 | 1/1972 | Saleck et al. | 96/94 R |
| 3,694,252 | 9/1972 | Gerber et al. | 264/7 X |
| 3,694,253 | 9/1972 | Gerber et al. | 264/7 X |
| 3,703,388 | 11/1972 | Araujo et al. | 106/DIG. 6 |
| 3,765,913 | 10/1973 | Murakami et al. | 106/DIG. 6 |
| 3,808,002 | 4/1974 | Eckert et al. | 106/1 X |
| 3,875,321 | 4/1975 | Gliemeroth et al. | 428/432 |
| 3,950,591 | 4/1976 | Gliemeroth et al. | 428/432 |

*Primary Examiner*—Theodore Morris
*Attorney, Agent, or Firm*—Kenway & Jenney

[57] ABSTRACT

Inorganic photochromic crystalline particles which are particularly useful in ophthalmic quality plastic host materials are formed for instance utilizing a silver halide crystal whose dimensions lie generally in the range between 30 Angstroms and 10,000 Angstroms. The surface of the silver halide crystal is coated with an inorganic material in an effective thickness to render the coating resistant to diffusion from within and to protect the crystal from interaction with host material. The stabilized coated particles can be introduced by known schemes into plastic host materials in order to form photochromic plastic articles useful in the preparation of films, sheets, filters for cameras, wall panels and ophthalmic lenses and other optical devices.

24 Claims, No Drawings

STABILIZED PHOTOCHROMIC MATERIALS

CROSS-REFERENCES TO RELATED APPLICATIONS

This application is a continuation-in-part of copending application Ser. No. 498,506 filed Aug. 19, 1974 (now abandoned).

BACKGROUND OF THE INVENTION

1. Field of the Invention

This invention is related to photochromic materials and is more particularly concerned with novel inorganic photochromic materials which are particularly useful for incorporation in ophthalmic quality plastic host materials.

2. Prior Art

Various types of photochromic compounds are known for use in optical and ophthalmic devices such as lenses, filters, and screens. These photochromic compounds change color on exposure to certain wavelengths of light or other electromagnetic radiation. These photochromic changes are reversible; that is, they change to and from the various colors on exposure to and withdrawal from the activating light radiation. It is known that the general basis of the photochromic reaction is produced by a photochromic substance which contains atoms or molecules capable of switching back and forth between and existing in two distinct energy states. These substances are induced into a higher energy state by absorption of the activating radiant energy which is generally of specific wavelengths defined by the particular materials, usually in the ultraviolet, and, in the absence of the activating radiant energy, return to their unactivated stable state. In the colored or activated state, they absorb certain ranges of light energy, and in the unactivated state the important photochromic materials pass most wavelengths of electromagnetic energy in the visible portion of the spectrum.

Photochromic materials are found in both plastics and inorganic glass materials. U.S. Patent application Ser. Nos. 180,221, filed Sept. 13, 1974; 370,247, filed June 15, 1973; and 445,029, filed Feb. 22, 1974, detail three specific photochromic systems which have been successfully incorporated into ophthalmic quality plastic host materials. However, one or more of a variety of difficulties is inherent with each of the foregoing applications (all of which applications are assigned to the Assignee of the present application). For example, many prior art photochromic systems which may be introduced into plastic materials, exist in the unactivated state as a colored dye. Upon activation with the incident radiation, they change to another colored state which passes less light within the visible spectrum. For some applications, such as ski goggles, such a condition is tolerable, and in fact, is even desirable. However, for normal usage, it is highly desirable to have a photochromic system which is essentially colorless in the unactivated state and which changes to an absorbing state with color upon activation. As will be understood, an absorbing state with color encompasses, for example, the shades of gray, blue, brown and green which are normally encountered in applications such as sunglasses. Some photochromic systems when introduced into plastic hosts, exhibit these color characteristics; however, all of those presently known which exhibit these characteristics are also characterized by having extremely short useful lives, such as a few days exposure to bright sunlight. That is, the dye system is susceptible to fatigue through a variety of mechanisms after a short period of exposure to sunlight. Therefore, these systems are not presently suitable for commercial applications requiring extended useful lives.

It is known to combine a photochromic material and a resinous material, for instance, U.S. Pat. No. 3,761,422 relates to the preparation of a photochromic plastisol composition containing metal complexes of diphenylthiocarbazone which can be formed into a film. U.S. Pat. No. 3,565,814 relates to a photochromic composition having a fast rate of color change comprising a polymer of lauryl methacrylate having dispersed throughout the body thereof various benzospiropyran compounds. U.S. Pat. No. 3,666,352 relates to a photochromic lens comprising a sheet of vinyl chloride-vinyl acetate copolymer containing a mercury dithiozonate compound laminated between glass or plastic layers.

The need for protection of photochromic materials against atmospheric oxygen has also been recognized by the prior art as a means of insuring reversibility, for instance, U.S. Pat. No. 3,716,489 discloses a method of producing a fast-acting photochromic filter in which the photochromic material is in the form of a solid solution in a solid optically transparent epoxy polymer or alternately a polycarbonate polymer matrix.

The desired characteristics for a photochromic material have been developed in various glasses. U.S. Pat. No. 3,208,860 to Armistead et al. is an example of such a photochromic glass. This patent teaches the formation of minute crystals of a silver halide within a silicate glass structure. The silver halide crystals are photochromic and exhibit an extended useful life.

SUMMARY OF THE INVENTION

Accordingly, it is an object of the present invention to provide an inorganic photochromic system which is readily introducible into various ophthalmic quality plastics and optical devices.

Another object is to provide such a photochromic system which is substantially colorless in the unactivated state and is colored in the activated state.

A further object is to provide a method for forming photochromic plastics utilizing the aforementioned system which is economical and feasible for manufacture on a commercial scale.

Briefly, the invention in its broadest aspect includes a photochromic particle comprising an inorganic crystalline photochromic crystal such as a silver halide crystal whose dimensions lie in the range between approximately 30 Angstroms and approximately 10,000 Angstroms preferably less than about 500 A and an inorganic material which is present on the surface of the silver halide crystal. The coating thickness is any effective thickness which is at least sufficient to seal the surface of the crystal and thus be effective in protecting the crystal from the adverse effects of halogen diffusion out of the crystal, monomers, catalysts and other deleterious chemicals present in the synthetic plastic materials. The coated particle thus protected exhibits photochromicity and fatigue properties approaching those found in glass hosts including the same crystalline photochromic particles.

Desirable inorganic materials useful in the process of this invention for protecting the inorganic photochromic crystalline particles include but are not limited to such materials as zinc oxide, titanium dioxide, aluminum oxide, antimony oxide, silicon dioxide, inorganic glasses and mixtures thereof.

DETAILED DESCRIPTION OF THE PREFERRED EMBODIMENTS

The process of the invention provides for the protection of an inorganic photochromic particle with a protective inorganic film by procedures such as but not limited to any of the following:

The crystalline inorganic photochromic material particles of the invention are obtained by formation of the crystals in situ by addition of appropriate chemicals to an appropriate reactive solvent system. For instance, a silver bromide sol is formed by pouring an aqueous ethanol solution of silver nitrate into a continuously stirred aqueous ethanol solution of sodium bromide. It is usually desirable to include as a dopant $Cu^+$, preferably as CuCl, in the sodium bromide solution. We prefer to replace 0.1 to 10% of the $Ag^+$ ions in the system with $Cu^+$. The preferred addition or $Ag^+$ replacement is 1% thereof. The sol formed is allowed to stand at room temperature. A polyvinylpyrrolidone solution in aqueous ethanol is next added. A coated crystal is produced by adding a small amount of concentrated sulfuric acid followed by a small amount of tetraethylorthosilicate.

The solvent phase of the sol is next evaporated yielding a fine powder consisting of silver bromide particles of the appropriate dimension to exhibit photochromism. In addition, the photochromic particles are coated with a continuous layer of silica. The function of the silica coating is to prevent halogen migration out of the crystal during photoactivation. A secondary purpose of the silica coating is to prevent interaction between the silver bromide particles and the plastic host material or components of the host material, such as the monomer and peroxides which are used in polymerization of some host materials.

In order to prepare silver halide crystals of a size preferable for the photochromic effect, i.e., about 30 A to about 10,000 Angstroms the concentration of the reacting solutions should be between 0.0005 M and 0.1 M. The concentrations of the reacting solutions should also be close to the stoichiometric ratio.

As will be recognized by those skilled in the art, other low molecular weight alcohols besides ethanol may be employed as the reaction medium since it forms no part of the particles being manufactured; for example, methanol, propanol, butanol. As an alternative means of providing small silver halide crystals, bulk material can be converted to in a finely divided form by methods known in the art of producing pigment materials such as by use of a colloid mill, fluid energy mill, or attrition mill.

Alternatively, separate solutions of silver nitrate, copper salts and alkali halides can be rapidly mixed and sprayed to form the copper doped silver halide crystals of appropriate size and to quickly evaporate the solvent.

The coating volume should be less than 100 times the crystal volume, preferably less than 10 times the crystal volume.

The function of the polyvinylpyrrolidone is to serve as a protective colloid which prevents further ripening (growth to larger sizes) of the silver halide particles. In addition to polyvinylpyrrolidone, other ripening inhibitors well-known to those skilled in the art may be used such as polyvinyl alcohol, polyacrylic acid, polyacrylamide and gelatin.

The purpose of the mineral acid such as sulfuric acid is to catalyze the decomposition of the tetraethylorthosilicate to silica during the evaporation step or stage. Other strong acids such as nitric, phosphoric and the like may be used. The strong halogen acids such as hydrofluoric, hydrochloric, hydrobromic and hydroidic should be avoided.

As will be apparent, other alkyl silicates such as tetramethylorthosilicate may be used in place of tetraethylorthosilicate as sources of the silica coating. In addition, the coating can be other halogen impervious materials such as $TiO_2$, $Al_2O_3$, ZnO, $Sb_2O_3$, inorganic glasses and mixtures thereof applied by procedures such as the following:

1. A titanium salt such as titanium chloride or other inorganic material is precipitated onto the surface of the photochromic material particle obtained as previously described. A particle within the range of about 30 A to about 10,000 Angstroms, preferably less than about 500 A is obtained. Precipitation can take place in an aqueous medium in which the photochromic material particle is dispersed by methods known to those skilled in the art and in which the titanium salt is dissolved. Subsequently, the titanium salt or other coating material is precipitated onto the photochromic material particle by evaporation of solvent or by reducing the solubility by temperature change or by chemical methods such as addition of a base or other anion that would cause precipitation of titanium salt. The coated particles are isolated and the titanium salt is changed to an oxide, if required, by the application of heat. Precipitation of such materials as titanium dioxide onto the surface of pigment particles is well-known in the art of preparing pigments for use in paint and other coatings. For instance, a titanium-calcium pigment is produced by precipitating titanium dioxide on the surface of calcium sulfate particles to produce a pigment having 30% to 50% titanium dioxide content. The titanium-calcium pigment, when so protected by a titanium dioxide surface coating, permits the use of calcium sulfate in water base paints which would not be possible otherwise since because of the partial solubility of calcium sulfate in water, the calcium ions present can react with materials present in water base paints such as proteinaceous materials as exemplified by casein. In a similar manner, therefore, it is possible to protect the photochromic material by a coating, for instance, of titanium dioxide and thereby to prevent the adverse effects of halogen migration out of the crystal and interaction of the particles with the plastic host material or other substances therein.

2. The photochromic material can also be produced by first providing a suitable finely divided particle by methods known in the art of producing pigment materials such as by use of an attrition mill, colloid mill, fluid energy mill, etc. The particles can range in size between about 30 A to about 10,000 Angstroms. Such particles are then added to a solution of the inorganic material, for instance, titanium dioxide is soluble in hot concentrated sulfuric acid as $TiOSO_4$. The inorganic material is then precipitated from the solution as, for example, by adjustment of pH and hydrolysis to form $TiO_2$ from $TiOSO_4$.

3. The photochromic material can be provided with a protective inorganic layer by suspension in an aqueous solution of hydrolyzed tetra-ethylorthosilicate. Upon evaporation of the water, and subsequent heating of the remaining particles, individually coated particles are obtained with a transparent layer of silicon dioxide.

4. As a further method of obtaining an encapsulated photochromic material particle, known vapor phase coating techniques are useful. For instance, oxide films can be produced by cathodic sputtering of a metal in an oxygen atmosphere, sulfide films by cathodic sputtering in hydrogen sulfide, nitride films by sputtering in nitrogen etc. The molecules of the reactive gas are activated in such process in the electric discharge so that chemical reaction can take place with the metal to produce the film of metallic compound. It should be noted that the use of the term "metal" used to refer to the inorganic material protective coating includes metalloids such as silicon, germanium, boron and phosphorus which are in the true sense nonmetals, but do in many ways act and react like metals and are useful in forming a protective coating for the photochromic material. By such a process, coatings of silicon dioxide, titanium dioxide, aluminum oxide, antimony oxide, zinc oxide, inorganic glasses and mixtures thereof can be produced on the surface of photochromic material particles. Alternatively, the coating compounds can be applied by vacuum evaporation, non-reactive sputtering or chemical vapor deposition techniques.

During the coating process, the photochromic material particle is kept in a state of suitable agitation, for example, by mechanical means so as to provide a substantially even coating on the surface of the photochromic particle.

The photochromic material coated with an inorganic material can be dispersed in a plastic host by various methods depending upon the material utilized as the host. For instance, where an allyl diglycol carbonate, for instance, the material sold under the trademark "CR 39" is utilized, the particles are dispersed in the monomer in combination with a suitable amount of catalyst and the mixture cast in a lens-shaped mold according to conventional techniques as disclosed in U.S. Pat. Nos. 3,278,654; 3,469,928; 3,211,811; 2,964,501; and 3,605,195; the collective disclosures of which patents are hereby incorporated by reference. Lenses cast according to the foregoing procedures can be ground, polished and glazed in a conventional manner using conventional techniques. The particles can be dispersed in other monomers and polymerization effected, for instance, using conventional bulk, solution, emulsion and suspension polymerization techniques.

The coated photochromic materials also can be incorporated in thermoplastic resins exemplified by such resins as polymethylmethacrylate, cellulose acetate butyrate, cellulose triacetate and polycarbonates such as those sold under the trademark "Lexan", a poly(4,4'-dioxydiphenyl-2,2-propane) carbonate. The encapsulated photochromic material particles are mixed, for instance, with a powdered form of resin such as polycarbonate and the mixture subsequently injection molded to produce an ophthalmic lens or optical device. Films can be prepared by casting from solution a mixture of the encapsulated photochromic material particles and a solution of a thermoplastic resin in a suitable solvent, for example, polymethylmethacrylate dissolved in toluene.

The proportion of encapsulated photochromic material of the invention utilized in combination with a plastic host material in the preparation of ophthalmic or optical devices is between about 0.01 to about 80 weight percent preferably about 0.05 to about 10 weight percent and depends necessarily upon the photochromic properties of the encapsulated photochromic material particle selected and the required optical density.

As will be apparent, the encapsulation of the photochromic material particles can be less than 100% complete, i.e., less than 100% of the particles can be coated and any given particle need not be wholly coated and yet provide substantial improvement over the unencapsulated photochromic material when incorporated in a plastic host material. The important criterion is that, as a whole, the particles of the photochromic material are coated to prevent halogen diffusion out of the crystal and to render them sufficiently resistant to the effects of oxygen, moisture or the effects of catalysts, or other chemical ingredients in the composition that would inhibit the functioning of the photochromic material, for instance, when the coated photochromic material particles are incorporated into a plastic host. The novel photochromic material particles coated with an inorganic protective material can be used to produce besides ophthalmic and optical devices, such articles as plastic window panes, sky lights, automobile windshields, camera filters, wall panels, jewelry, toys, advertising articles and the like.

It will be recognized by those skilled in the art that the particle size of the coated photochromic material particles utilized in a transparent article such as a lens is relatively small as compared to the particle size of coated particles which can be utilized in a translucent or reflective article such as a wall panel.

The coated photochromic silver halide particles of the invention are dispersed in the plastic host by various methods depending on the host. In the case of an allyl resin such as CR-39, the particles are dispersed in the monomer which is subsequently catalyzed and cast in lens-shaped molds according to conventional techniques. Those skilled in the art will recognize CR-39 as the shorthand designation for a conventional material from which plastic ophthalmic lenses are made; namely, allyldiglycolcarbonate. Other usable hosts include cellulose triacetate, cellulose acetate butyrate (CAB), bisphenol-A polycarbonate, polymethylmethacrylate, polystyrene, epoxies and polyesters, art recognized mixtures and copolymers of the foregoing. Also usable are ophthalmic quality plastics in general.

In the above discussion of the formation of silver halides by precipitation, we mentioned sodium bromide as the starting halide. It should be understood that other starting halides may be used. For example, sodium iodide or sodium chloride. In addition, combinations of the various alkali halides may be used, for example, combinations of sodium chloride and sodium bromide. Other iodides, chlorides and bromides which result in silver salts thereof are also usable. As far as we are able to determine, any proportion will work, for example, from 0 to 99% of sodium chloride with 1 to 100% of sodium bromide.

In addition, up to 50 ion percent or consistent with the solubility limits of the $Ag^+$ in the silver halide particle or crystal can be replaced by a suitable monovalent ion selected from the group $Cu^+$ $Li^+$, $Na^+$, $K^+$, $Rb^+$, $Cs^+$ and $Tl^+$ or mixtures thereof. Certain divalent ions such as $Ca^{++}$, $Mg^{++}$, $Sr^{++}$, $Ba^{++}$, $Zn^{++}$, $Cd^{++}$, $Pb^{++}$ and $Be^{++}$ can also be substituted for $Ag^+$ in ion percentages up to the solubility limit.

The following examples are set forth for purposes of illustration only and are not to be construed as limitations of the instant invention except as set forth in the appended claims. All parts and percentages are by weight and all temperatures are in degrees centigrade unless otherwise specified.

EXAMPLE 1

Photochromic silver halide particles of the appropriate dimensions are prepared by adding one liter of 0.1 M silver nitrate solution to one liter of 0.1 M potassium bromide solution with continuous and rapid stirring. The solvent for each reactant is water-ethanol in a one-to-one volume ratio. The silver bromide sol, thus formed, is allowed to stand at room temperature for approximately 10 minutes before adding 100 grams of a 5% solution of polyvinylpyrrolidone in ethanol.

To the stabilized silver bromide sol prepared in the above manner is added one liter of an aqueous solution containing 100 grams of titanyl sulfate. Next are added 200 ml of a 20% solution of sodium hydroxide. Titanium hydroxide first forms as a coating on the silver bromide particles and becomes titanium dioxide after evaporation of the solvent and drying according to the following reaction:

$$2Ti(OH)_3 \rightarrow 2TiO_2 + 2H_2O + H_2$$

The particles prepared in the above manner in the amount of 0.7 gram are dispersed in 95 grams of allyl diglycol carbonate prepolymer containing 5 grams of iso-propyl peroxide. The prepolymer mixture is then injected into glass lens forming molds. After polymerization and curing in a conventional manner, the plastic lenses are removed from the mold. The lenses thus formed are colorless and turn a gray shade in bright sunlight. The lenses return to their normal colorless condition in 20-30 minutes when brought indoors.

EXAMPLE 2

One liter of 0.01 M silver nitrate solution in methanol is added rapidly with continuous stirring to a 0.01 M solution of potassium chloride in methanol. The latter solution also contains cuprous chloride at a concentration of 0.005M. The solvent is rapidly evaporated by pouring the reaction solution on a shallow tray preheated to 50° C. The silver chloride doped with copper under these conditions is crystallized rapidly in the form of very fine colorless crystals which are further reduced in size by passing them through either a colloid mill or a fluid energy mill.

Approximately 1 gram of the extremely fine crystalline silver chloride is suspended in 20 ml of a 3% aqueous solution of tetraethylorthosilicate and 8 grams of sulfuric acid. Satisfactory suspension of the crystalline particles is provided by rapid stirring with a magnetic stirrer. The solvent is driven off by gentle heating under vacuum. The microcrystalline particles are collected and subsequently heated to produce photochromic crystalline particles individually coated with a thin transparent layer of silicon dioxide. 0.5 gram of the coated crystalline particles are suspended in 100 grams of methylmethacrylate monomer containing 0.5% by weight of benzoyl peroxide. The prepolymer mix containing the coated suspended particles is cast in rectangular glass molds which after polymerization yield flat photochromic plates ⅛inch thick. When activated by an ultraviolet light source or by bright sunlight, these plates change from colorless to to gray. Recovery occurs within several minutes when placed in the dark.

EXAMPLE 3

One liter of 0.01 M silver nitrate solution in methanol and one liter of 0.01 M solution of sodium bromide which also contains anhydrous cuprous bromide at a concentration of 0.005 M are pumped under pressure through separate hose lines to a single nozzle. A fine spray is obtained in a collection chamber provided with filtered inlet and outlet tubes for the introduction of a stream of clean air to facilitate rapid evaporation of the solvent. The colorless crystals so obtained are further reduced in size by passing them through a attrition mill. In this example, the doped silver bromide crystals which are reduced to an appropriate size are provided with a transparent coating by sputtering with a silicate.

1.0 gram of the coated particles is intimately mixed with 44 grams of cellulose acetate butyrate and 5 grams of dioctyl phthalate. Injection molded plano lenses are then prepared with a 2 mm thickness and a 6-base curve. The lenses are essentially colorless before activation but turn a gray shade when activated. In the absence of activating light, the lenses return to their original colorless state in several minutes.

EXAMPLE 4

Silver halide crystalline particles doped with copper are prepared using the method of Example 3. The resulting crystalline particles are provided with a transparent protective coating by sputtering with aluminum in an oxygen atmosphere. Thus, each small crystalline particle is provided with a coating of $Al_2O_3$.

0.5 gram of the coated crystalline particles described above is suspended in 100 ml of a 20% solution of polymethylmethacrylate in toluene and a film cast on a 3 mil thick Mylar support. After evaporation of the solvent, a photochromic film is obtained which is colorless but which changes to a gray color upon exposure to sunlight. In the dark the film returns to its original colorless state.

We claim:

1. A photochromic particle for incorporation into a host for imparting photochromic properties thereto, said particle comprising:
   an inorganic crystalline halide material selected from the group consisting of chloride, bromide, iodide, and mixtures thereof whose dimensions lie in the range between approximately 30 Angstroms and 10,000 Angstroms, said material being capable of changing to a higher energy, light absorbing state when exposed to activating radiation; and
   a coating on the surface of said crystalline material said coating being an inorganic non-oxide coating, the coating volume being less than about 100 times the volume of said material and being effective to render the particle impervious both to halogen diffusion out of the crystal produced during photoactivation and impervious to host chemistry.

2. A photochromic particle according to claim 1, wherein said crystalline material is a silver halide crystal doped with up to 10 ion percent of $Cu^+$.

3. A photochromic particle according to claim 1, wherein said crystalline material is a silver halide crystal and up to 50 ion percent of the silver ion is replaced by an ion selected from the group consisting of $Cu^+$, $Li^+$, $Na^+$, $K^+$, $Rb^+$, $Cs^+$, $Cs^+$, $Ti^+Ca^{++}$, $Mg^{++}$, $Sr^{++}$, $Ba^{++}$, $Zn^{++}$, $Cd^{++}$, $Be^{++}$ and mixtures thereof.

4. A photochromic particle according to claim 1, wherein the dimensions of the particle are less than about 500 Angstroms.

5. A photochromic particle according to claim 1, wherein said inorganic non-oxide coating is an inorganic non-oxide glass.

6. A photochromic particle according to claim 1, wherein said crystal material is a silver halide crystal.

7. A photochromic plastic material comprising a plastic host having photochromic particles dispersed therein, said photochromic particles comprising silver halide crystals selected from the group consisting of silver chloride, silver bromide, silver iodide, and mixtures thereof, the dimensions of said crystals lying in the range between approximately 30 Angstroms and approximately 10,000 Angstroms, said crystals being capable of changing to a higher energy, light absorbing state when exposed to activating radiation, said crystals being coated with an inorganic nonoxide material to a coating volume less than 100 times the volume of the crystal, the coating being effective to protect said crystal from the adverse effects of halogen diffusion out of the crystal which occurs during photoactivation and host chemistry, the concentration of said silver halide crystals being from about 0.05 to about 10 percent of the photochromic plastic material.

8. A photochromic plastic material according to claim 7, wherein the photochromic particles are uniformly dispersed in said host material.

9. A photochromic plastic material according to claim 7, wherein said host material is selected from the group consisting of polymethylmethacrylate, allyl diglycol carbonate, polycarbonate, cellulose acetate butyrate, and cellulose triacetate.

10. A process for producing a photochromic particle suitable for incorporation into a plastic host to impart photochromic properties thereto, said process being characterized by the steps of:
forming silver halide crystals the dimensions of which lie in the range between approximately 30 Angstroms and 10,000 Angstroms; and
coating the surface of said crystals with a volume of material effective to render the particle impervious to diffusion of halogen produced during photoactivation and effective to protect the crystal from host chemistry, the coating step being effected by adding an acid to a dispersion of silver halide crystals, adding one of the group consisting of tetraethylorthosilicate and tetramethylorthosilicate, and evaporating the liquid phase of the dispersion.

11. A process for producing a photochromic particle suitable for incorporation into a plastic host to impart photochromic properties thereto, said process being characterized by the steps of:
forming silver halide crystals the dimensions of which lie in the range between approximately 30 Angstroms and 10,000 Angstroms; and
coating the surface of said crystals with a volume of material effective to render the particle impervious to diffusion of halogen produced during photoactivation and effective to protect the crystal from host chemistry, the coating step being effected by precipitating a titanium salt onto the surface of the crystal.

12. The process of claim 11 wherein said titanium salt is changed to an oxide by the application of heat.

13. A process for producing a photochromic particle suitable for incorporation into a plastic host to impart photochromic properties thereto, said process being characterized by the steps of:
forming silver halide crystals the dimensions of which lie in the range between approximately 30 Angstroms and 10,000 Angstroms; and
coating the surface of said crystals with a volume of material effective to render the particle impervious to diffusion of halogen produced during photoactivation and effective to protect the crystal from host chemistry, the coating step being effected by cathodic sputtering in an atmosphere selected from the group consisting of oxygen, hydrogen sulfide, and nitrogen.

14. A process for producing a photochromic particle suitable for incorporation into a plastic host to impart photochromic properties thereto, said process being characterized by the steps of:
forming silver halide crystals, the dimensions of which lie in the range between approximately 30 Angstroms and 10,000 Angstroms, the forming step being effected by precipitating said silver halide crystals by mixing a silver salt solution with a halide salt solution in the presence of a ripening inhibitor; and
coating the surface of said crystal with a volume of material effective to render the particle impervious to diffusion of halogen produced during photoactivation and effective to protect the crystal from host chemistry.

15. A photochromic lens comprising an optically clear plastic host having photochromic particles dispersed therein, each of said photochromic particles comprising a silver halide crystal the dimensions of which lie in the range between approximately 30 Angstroms and 10,000 Angstroms, the silver halide being selected from the group consisting of silver chloride, silver bromide, silver iodide, and mixtures thereof, the crystals being capable of changing to a higher energy, light absorbing state when exposed to activating radiation, said crystals being coated with an inorganic non-oxide material to a coating volume less than about 100 times the volume of the crystal, the coating being effective to protect said crystal from the adverse effects of halogen diffusion out of the crystal which occurs during photoactivation and host chemistry, the concentration of said silver halide crystals in the host being between about 0.05 and 10 weight percent.

16. The lens as set forth in claim 15 wherein the crystal is doped with up to 10 ion percent of $Cu^+$.

17. The lens as set forth in claim 15 wherein up to 50 ion percent of the silver ion in said crystal is replaced by an ion slected from the group consisting of $Cu^{+/}$, $Li^+$, $Na^+$, $K^+$, $Rb^+$, $Cs^+$, $Tl^+$, $Ca^{++}$, $Mg^{++}$, $Sr^{++}$, $Ba^{++}$, $Zn^{++}$, $Cd^{++}$, $Be^{++}$, and mixtures thereof.

18. The lens as set forth in claim 15 wherein the dimensions of the particle are less than about 500 Angstroms.

19. The lens as set forth in claim 15 wherein the non-oxide coating is an inorganic non-oxide glass.

20. A process for producing a photochromic plastic lens, said process being characterized by the steps of:
forming silver halide crystals the dimensions of which lie in the range between approximately 30 Angstroms and 10,000 Angstroms;
coating the surface of the crystal with a volume of material effective to render the particle impervious to diffusion of halogen produced during photoactivation and effective to protect the crystal from plastic lens chenistry, said coating step being effected by adding an acid to a dispersion of silver halide crystals, adding one of the group consisting of tetraethylorthosilicate and tetramethylorthosilicate, and evaporating the liquid phase of the dispersion;

incorporating between about 0.05 and 10 weight percent of the coated particles into a plastic material; and forming a lens from said plastic material.

21. A process for producing a photochromic plastic lens, said process being characterized by the steps of:

forming silver halide crystals the dimensions of which lie in the range between approximately 30 Angstroms and 10,000 Angstroms;

coating the surface of the crystal with a volume of material effective to render the particle impervious to diffusion of halogen produced during photoactivation and effective to protect the crystal from plastic lens chemistry, said coating step being effected by precipitating a titanium salt onto the surface of the crystals;

incorporating between about 0.05 and 10 weight percent of the coated particles into a plastic material; and forming a lens from said plastic material.

22. The process as set forth in claim 21 wherein the titanium salt is changed to an oxide by the application of heat.

23. A process for producing a photochromic plastic lens, said process being characterized by the steps of:

forming silver halide crystals the dimensions of which lie in the range between approximately 30 Angstroms and 10,000 Angstroms;

coating the surface of the crystal with a volume of material effective to render the particle impervious to diffusion of halogen produced during photoactivation and effective to protect the crystal from plastic lens chemistry, said coating step being effected by cathodic spattering in an atmosphere selected from the group consisting of oxygen, hydrogen sulfide, and nitrogen;

incorporating between about 0.05 and 10 weight percent of the coated particles into a plastic material; and forming a lens from said plastic material.

24. A process for producing a photochromic plastic lens, said process being characterized by the steps of:

forming silver halide crystals, the dimensions of which lie in the range between approximately 30 Angstroms and 10,000 Angstroms, by precipitating silver halide crystals by mixing a silver salt solution in the presence of a ripening inhibitor;

coating the surface of said crystals with a volume of material effective to render the particles impervious to diffusion of halogen produced during photoactivation and effective to protect the crystal from host chemistry;

incorporating between about 0.05 and 10 weight percent of the coated particles into a plastic material; and forming a lens from said plastic material.

* * * * *